US011581556B2

(12) United States Patent
Yu et al.

(10) Patent No.: US 11,581,556 B2
(45) Date of Patent: Feb. 14, 2023

(54) FUEL CELL SYSTEM

(71) Applicants: Hyundai Motor Company, Seoul (KR); Kia Motors Corporation, Seoul (KR)

(72) Inventors: Jung Han Yu, Gyeonggi-do (KR); Hyeon Seok Ban, Gyeonggi-Do (KR); Bo Ki Hong, Seoul (KR); Hyun Yoo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 152 days.

(21) Appl. No.: 17/116,491

(22) Filed: Dec. 9, 2020

(65) Prior Publication Data
US 2022/0045342 A1 Feb. 10, 2022

(30) Foreign Application Priority Data

Aug. 10, 2020 (KR) ........................ 10-2020-0099717

(51) Int. Cl.
| | |
|---|---|
| *H01M 8/04* | (2016.01) |
| *H01M 8/04082* | (2016.01) |
| *H01M 8/04701* | (2016.01) |
| *H01M 8/04858* | (2016.01) |
| *H01M 8/1004* | (2016.01) |
| *H01M 8/04119* | (2016.01) |

(52) U.S. Cl.
CPC ..... *H01M 8/04201* (2013.01); *H01M 8/0491* (2013.01); *H01M 8/04126* (2013.01); *H01M 8/04723* (2013.01); *H01M 8/1004* (2013.01); *H01M 2250/20* (2013.01)

(58) Field of Classification Search
CPC ......... H01M 8/04201; H01M 8/04126; H01M 8/04723; H01M 8/0491; H01M 8/1004; H01M 2250/20
USPC ........................................................ 429/483
See application file for complete search history.

(56) References Cited

U.S. PATENT DOCUMENTS

| | | | |
|---|---|---|---|
| 2009/0253001 A1* | 10/2009 | Ito ....................... | H01M 8/1032 429/412 |
| 2019/0237779 A1* | 8/2019 | Inamoto .............. | H01M 8/0494 |
| 2019/0270392 A1* | 9/2019 | Sakai ................ | H01M 8/04089 |

FOREIGN PATENT DOCUMENTS

| | | |
|---|---|---|
| JP | 2005-129384 A | 5/2005 |
| JP | 2007-242523 A | 9/2007 |
| JP | 4830357 B2 | 12/2011 |
| JP | 5205694 B2 | 6/2013 |

(Continued)

OTHER PUBLICATIONS

D. E. Curtin et al., J. Power Sources, 131, 41-48 (2004).

(Continued)

*Primary Examiner* — James M Erwin
(74) *Attorney, Agent, or Firm* — Fox Rothschild LLP (57) ABSTRACT

A fuel cell system capable of improving the chemical durability of a membrane electrode assembly by compensating for the amount of an antioxidant lost within the electrolyte membrane or electrode of the fuel cell stack in such a manner that the antioxidant is provided from an antioxidant supply device, provided in a fuel processing system and/or an air processing system, to a fuel cell stack, in preparation for a case where the antioxidant within the electrolyte membrane or electrode is lost due to the dissolution or migration characteristic of the antioxidant.

21 Claims, 6 Drawing Sheets

(56) References Cited

FOREIGN PATENT DOCUMENTS

| | | |
|---|---|---|
| JP | 5233069 B2 | 7/2013 |
| KR | 2015-0057007 A | 5/2015 |
| KR | 2019-0080049 A | 7/2019 |

OTHER PUBLICATIONS

A.P. Young et al., J. Electochem. Soc., 157, B425-B436 (2010).
P. Trogadas et al., Electrochem. Solid-State Lett., 11, B113-B116 (2008).
R. Uegaki et al., J. Power Sources, 196, 9856-9861 (2011).
D. Zhao et al., J. Power Sources, 190, 301-306 (2009).

* cited by examiner

FUEL CELL SYSTEM

CROSS-REFERENCE TO RELATED APPLICATION

This application claims under 35 U.S.C. § 119(a) the benefit of priority to Korean Patent Application 10-2020-0099717 filed on Aug. 10, 2020, the entire contents of which are incorporated herein by reference.

TECHNICAL FIELD

The present invention relates to a fuel cell system capable of improving the chemical durability of a membrane electrode assembly by compensating for the amount of an antioxidant lost within an electrolyte membrane or an electrode.

BACKGROUND

A fuel cell system typically includes a fuel cell stack for generating electrical energy, a fuel processing system (FPS) for supplying fuel (i.e., hydrogen) to the fuel cell stack, an air processing system (APS) for supplying the fuel cell stack with oxygen within air, for example, an oxidizer necessary for an electrochemical reaction, and a heat and water management system for controlling an operating temperature of the fuel cell stack.

The fuel cell stack has a structure in which multiple unit cells for generating electrical energy through a reaction between hydrogen ($H_2$) and oxygen ($O_2$) are stacked and assembled. Each of the unit cells includes a membrane electrode assembly (MEA) with a perfluorinated sulfonic acid ionomer-based electrolyte membrane, an anode electrode positioned on one side of the electrolyte membrane and supplied with hydrogen ($H_2$), and a cathode electrode positioned on the other side of the electrolyte membrane and supplied with air, and gas diffusion layers (GDLs) stacked on the outside of the anode electrode and the cathode electrode.

Accordingly, a reaction for generating the electricity of the fuel cell stack occurs in the MEA. After hydrogen supplied to the anode electrode, i.e. an oxidation pole, is separated into hydrogen protons and electrons, the hydrogen protons are moved to the cathode electrode, i.e. a reduction pole, through the electrolyte membrane, and the electrons are moved to the cathode electrode through an external circuit. Oxygen molecules, the hydrogen protons and the electrons reach each other in the cathode electrode, thus generating electricity and heat and also generating water ($H_2O$) as reaction by-products.

During the reaction for generating the electricity of a fuel cell, hydrogen and oxygen within air cross over through the electrolyte membrane and thus facilitate the generation of hydrogen peroxide (HOOH). Such hydrogen peroxide generates oxygen-containing radicals, such as hydroxyl radicals (.OH) and hydroperoxyl radicals (.OOH).

Such radicals cause the chemical degradation of the electrolyte membrane by attacking the perfluorinated sulfonic acid ionomer-based electrolyte membrane, thus having a bad influence of reducing the durability of the fuel cell.

Accordingly, as a conventional technology for mitigating the chemical degradation of the electrolyte membrane, a method of adding various types of antioxidants to the electrolyte membrane or the electrode has been introduced.

In the conventional technology, the antioxidant includes a primary antioxidant having a radical scavenger function and a secondary antioxidant having a hydrogen peroxide decomposer function. The primary antioxidant and the secondary antioxidant may be used solely or in combination.

For example, representative primary antioxidants used for a perfluorinated sulfonic acid electrolyte membrane for a polymer electrolyte membrane fuel cell include a cerium-based antioxidant such as cerium oxide or ceria or cerium (III) nitrate hexahydrate, a terephthalic acid-based antioxidant, and the like. A representative secondary antioxidant includes a manganese-based antioxidant such as manganese oxide.

The electrolyte membrane to which a large amount of such an antioxidant is added increases chemical durability, but may decrease performance of a unit cell that constitutes a fuel cell because a sulfonic acid group included in the electrolyte membrane decreases proton conductivity through coupling with a positive ion antioxidant.

Furthermore, an antioxidant, such as cerium oxide introduced into the electrolyte membrane, is ionized and dissolved during the manufacturing process or operation of the fuel cell. An antioxidant directly introduced in an ion form like cerium salt hydrate is lost to the outside of each unit cell of the fuel cell because the antioxidant is easily moved in an environment in which the fuel cell operates, and may degrade the durability of the electrolyte membrane in the long term.

Accordingly, the antioxidant is preferably used properly by taking into consideration the performance and durability of a fuel cell.

SUMMARY

In preferred aspects, provided is a fuel cell system that may improve the chemical durability of a membrane electrode assembly by compensating for the amount of an antioxidant lost within the electrolyte membrane or electrode of the fuel cell stack. For example, the antioxidant may be provided from an antioxidant supply device, provided in a fuel processing system and/or an air processing system to a fuel cell stack in order to prevent disadvantage that the antioxidant within the electrolyte membrane or electrode is lost due to the dissolution or migration characteristic of the antioxidant.

In an aspect, provided is a fuel cell system includes an antioxidant supply device positioned at a predetermined location of a fuel processing system (FPS) for supplying hydrogen to a fuel cell stack, a predetermined location of an air processing system (APS) for supplying air to the fuel cell stack, or a predetermined location of the FPS and the APS and a controller configured to determine required timing at which an antioxidant needs to be supplemented and supplied to the fuel cell stack, control the antioxidant to be supplied from the antioxidant supply device positioned at the predetermined location of the FPS or the APS to the fuel cell stack, or control the antioxidant to be supplied from the antioxidant supply device positioned at the predetermined location of the FPS and the APS to the fuel cell stack.

Preferably, the fuel cell system may include a first antioxidant supply device positioned at a predetermined location of a fuel processing system (FPS) for supplying hydrogen to a fuel cell stack, a second antioxidant supply device positioned within the humidifier of an air processing system (APS) for supplying air to the fuel cell stack, and a controller configured to determine required timing at which an antioxidant needs to be supplemented and supplied to the fuel cell stack, control the antioxidant to be supplied from the first antioxidant supply device or the second antioxidant supply device to the fuel cell stack or control the antioxidant to be supplied from the first antioxidant supply device and the second antioxidant supply device to the fuel cell stack.

The first antioxidant supply device may be positioned at: i) the upstream or downstream of an ejector on the hydrogen supply line of the FPS, ii) the upstream of the ejector on a hydrogen recycle line, or iii) a location directly coupled to the ejector.

The controller may be configured to determine that the antioxidant needs to be further supplied to the fuel cell stack either when a predetermined time of operation of the fuel cell stack has expired or when a vehicle on which the fuel cell stack is mounted has reached a predetermined mileage.

Furthermore, the controller may be configured to additionally use state information, indicating that a current of the fuel cell stack exceeds 0 A, as an element to determine the required timing at which the antioxidant needs to be supplemented and supplied to the fuel cell stack.

Furthermore, the controller may be configured to additionally use temperature information, indicating that a temperature of a stack coolant is about 60° C. or greater, as an element to determine the required timing at which the antioxidant needs to be supplemented and supplied to the fuel cell stack for a smooth supply of the antioxidant and an easy migration of the antioxidant within a membrane electrode assembly.

The first antioxidant supply device may be configured to include a mixing chamber having a hydrogen inflow hole formed on one side thereof and a hydrogen outflow hole formed on the other side thereof, an antioxidant reservoir positioned under the mixing chamber, a partition wall configured to divide the mixing chamber and the antioxidant reservoir as separate spaces, and an antioxidant discharge pipe mounted on the partition wall while making the mixing chamber and the antioxidant reservoir communicate with each other and configured to discharge the antioxidant within the antioxidant reservoir to the mixing chamber.

An ultrasonic transducer operating to generate ultrasonic waves in response to a control signal from the controller in order to vaporize the antioxidant, a heater whose on and off are controlled by the controller in order to heat the antioxidant, and a level sensor for detecting a storage level of the antioxidant and transmitting a detection signal to the controller may be mounted on the antioxidant reservoir of the first antioxidant supply device.

Preferably, the ultrasonic transducer operating to generate ultrasonic waves in response to a control signal from the controller in order to vaporize the antioxidant may be mounted on the antioxidant reservoir.

The discharge pipe may a nozzle shape inclined from the hydrogen inflow hole toward the hydrogen outflow hole and having a diameter gradually narrowed toward the mixing chamber.

Preferably, an angle $\theta$ between the discharge pipe and the partition wall may be set to $0°<\theta<90°$, and a lower inner diameter of the discharge pipe positioned within the antioxidant reservoir may be set to be greater than an upper inner diameter of the discharge pipe positioned within the mixing chamber.

Preferably, the heater who's on and off are controlled by the controller in order to heat the stored antioxidant is mounted on the antioxidant reservoir. The heater is adopted to operate to raise a temperature of an antioxidant solution to about 60 to 80° C. in response to a control signal from the controller before the antioxidant is supplied to the mixing chamber.

Preferably, a level sensor for detecting a storage level of the antioxidant and transmitting a detection signal to the controller may be mounted on the antioxidant reservoir.

Preferably, the controller may be configured to determine filling timing of the antioxidant based on the detection signal of the level sensor and to display a warning for the filling of the antioxidant on an interior display of the fuel cell vehicle.

The first antioxidant supply device may include an antioxidant reservoir in which the antioxidant is stored, a discharge pipe coupled to the bottom of the antioxidant reservoir, and a valve mounted on the discharge pipe and configured to be opened and shut in response to a control signal from the controller.

A heater who's on and off are controlled by the controller in order to heat the stored antioxidant and a level sensor for detecting a storage level of the antioxidant and transmitting a detection signal to the controller may be mounted on the antioxidant reservoir of the first antioxidant supply device.

Preferably, the heater who's on and off are controlled by the controller in order to heat the stored antioxidant may be mounted on the antioxidant reservoir. The heater operates to raise a temperature of an antioxidant solution to about 60 to 80° C. in response to a control signal from the controller before the antioxidant is supplied to the fuel cell stack.

Preferably, a level sensor for detecting a storage level of the antioxidant and transmitting a detection signal to the controller may be mounted on the antioxidant reservoir.

Preferably, the controller may be configured to determine filling timing of the antioxidant based on the detection signal of the level sensor and to display a warning for the filling of the antioxidant on an interior display of the fuel cell vehicle.

A second antioxidant supply device positioned at the predetermined location of the APS in the antioxidant supply device may be positioned within a humidifier.

The second antioxidant supply device may include an antioxidant reservoir positioned under a partition wall formed within the humidifier, a hollow fiber membrane positioned within the antioxidant reservoir and positioned so that the antioxidant permeates into the hollow fiber membrane through which dry air passes, and a level sensor mounted on the antioxidant reservoir and configured to detect a storage level of the antioxidant and to transmit a detection signal to the controller. In addition to a first dry air inlet for leading the dry air into the humidifier, a second dry air inlet for leading the dry air into the antioxidant reservoir is formed on one side of the humidifier.

In particular, a valve for an air distribution, which is opened and shut to supply the dry air to the humidifier through the first dry air inlet or simultaneously supply the dry air to the humidifier and the second antioxidant supply device, may be positioned at a rear end of the first dry air inlet and the second dry air inlet.

Preferably, a level sensor for detecting a storage level of the antioxidant and transmitting a detection signal to the controller may be mounted on the antioxidant reservoir.

The controller may be configured to determine filling timing of the antioxidant based on the detection signal of the level sensor and to display a warning for the filling of the antioxidant on an interior display of the fuel cell vehicle.

The controller may be configured to additionally use state information that indicates i) a current of the fuel cell stack exceeds 0 A, as an element to determine when the antioxidant needs to be further supplied to the fuel cell stack, and/or ii) a temperature of a stack coolant is 60° C. or greater, as an element to determine when the antioxidant needs to be further supplied to the fuel cell stack for a smooth supply of the antioxidant and a migration of the antioxidant within a membrane electrode assembly.

Other aspect of the invention are disclosed infra.

BRIEF DESCRIPTION OF THE DRAWINGS

The above and other features of the present invention will now be described in detail with reference to certain exemplary examples thereof illustrated in the accompanying drawings which are predetermined herein below by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

Hereinafter, preferred exemplary embodiments of the present invention will be described with reference to the accompanying drawings. The items expressed in the accompanying drawings may be different from forms actually implemented as schematic drawings for easily describing exemplary embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The fuel cell system may supply an antioxidant from the outside to a fuel cell stack in order to compensate for the amount of the antioxidant lost if the antioxidant is lost in the electrolyte membrane of the fuel cell stack and the ionomer of the anode and cathode electrodes.

Figure 1:
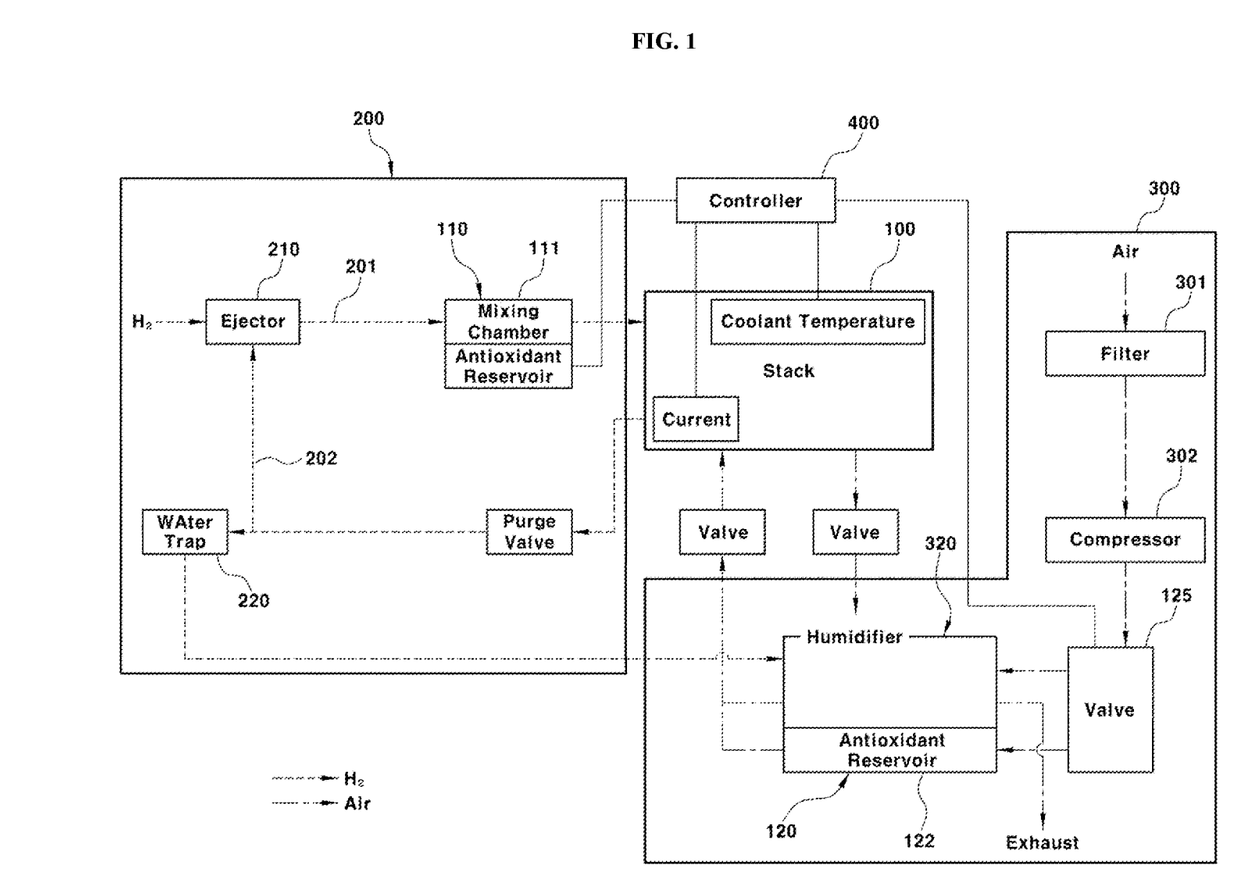
FIG. 1 shows an exemplary fuel cell system according to an exemplary embodiment of the present invention.

FIG. 1 shows an exemplary fuel cell system according to an exemplary embodiment of the present invention. A reference numeral 100 denotes the fuel cell stack.

A fuel processing system (FPS) 200 for supplying hydrogen and an air processing system (APS) 300 for supplying oxygen within air are coupled to the fuel cell stack 100.

The fuel cell system may be configured to supply an antioxidant through the FPS 200 or the APS 300 or both the FPS 200 and the APS 300, when supplying the antioxidant to the fuel cell stack 100.

As shown in FIG. 1, the FPS 200 may include a hydrogen supply line 201 connected from a hydrogen tank to the fuel cell stack 100, a hydrogen recycle line 202 for recycling hydrogen, not reacted in the fuel cell stack 100, to the hydrogen supply line 201, an ejector 210 mounted on a point where the hydrogen supply line 201 and the hydrogen recycle line 202 may be met, and a water trap 220 for trapping water discharged along with hydrogen not reacted in the fuel cell stack 100.

The ejector 210 functions to supply new hydrogen, flowing along the hydrogen supply line 201 from the hydrogen tank, and unreacted recycle hydrogen via the hydrogen recycle line 202 toward the anode electrode of the fuel cell stack 100.

In particular, a first antioxidant supply device 110 according to an embodiment of the present invention is positioned at a given location of the FPS 200.

Figure 3:
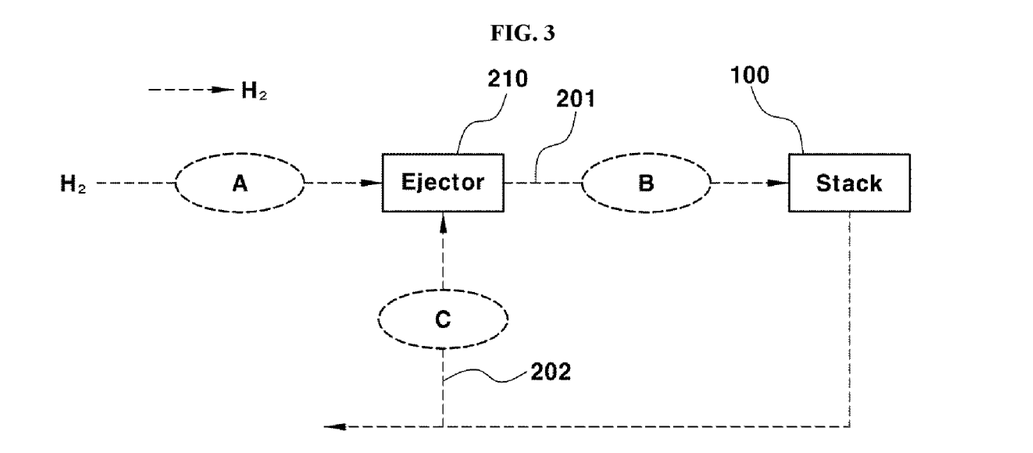
FIG. 3 shows locations where the first antioxidant supply device illustrated in FIG. 2 may be positioned in a fuel processing system (FPS).

For example, as illustrated in FIG. 3, the first antioxidant supply device 110 may be positioned in one of the upstream A or downstream B of the ejector 210 on the hydrogen supply line 201 and the upstream C of the ejector 210 on the hydrogen recycle line 202.

Figure 2:
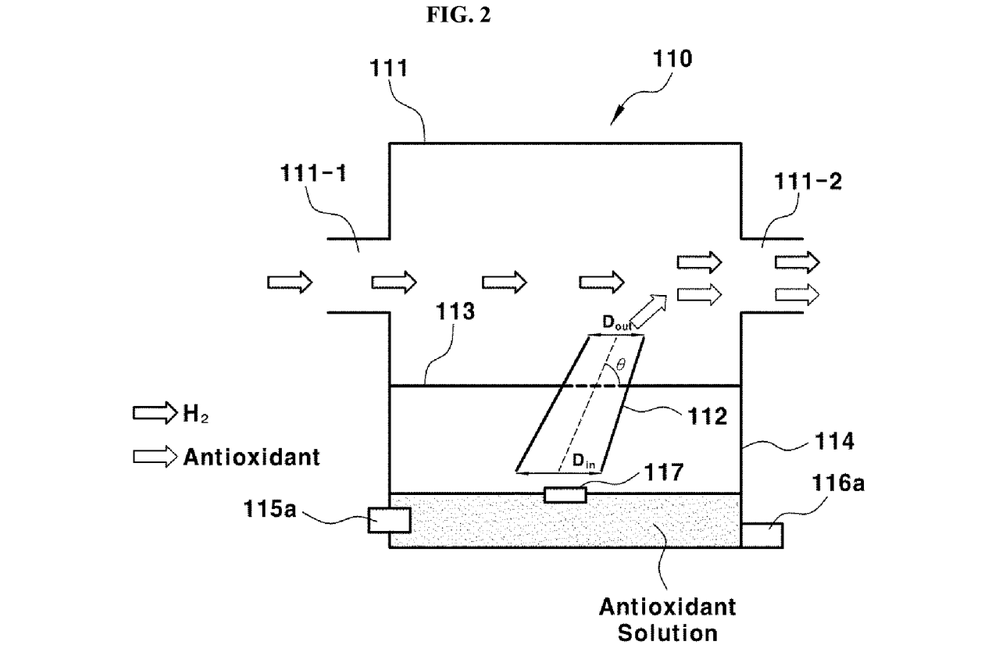
FIG. 2 shows a first antioxidant supply device of the elements of an exemplary fuel cell system according to an exemplary embodiment of the present invention.

As shown in FIG. 2, the first antioxidant supply device 110 may be configured to include a mixing chamber 111 having a hydrogen inflow hole 111-1 formed on one side thereof and a hydrogen outflow hole 111-2 formed on the other side thereof, an antioxidant reservoir 114 positioned under the mixing chamber 111, a partition wall 113 that divides the mixing chamber 111 and the antioxidant reservoir 114 as separate spaces, an antioxidant discharge pipe 112 configured to make the mixing chamber 111 and the antioxidant reservoir 114 communicate with each other and mounted on the partition wall 113, and the like.

The antioxidant discharge pipe 112 may function as a passage for smoothly supplying an antioxidant within the antioxidant reservoir 114 to the mixing chamber 111. The partition wall 113 may function to prevent the antioxidant, supplied from the antioxidant reservoir 114 to the mixing chamber 111, from flowing backward to the antioxidant reservoir 114.

Furthermore, an ultrasonic transducer 117 driven in response to a signal from a controller 400 may be positioned within the antioxidant reservoir 114. The ultrasonic transducer 117 may function to vaporize an antioxidant solution by generating ultrasonic waves.

The hydrogen inflow hole 111-1 of the mixing chamber 111 may be coupled to the hydrogen tank, such as a hydrogen supply source. The hydrogen outflow hole 111-2 may be coupled to the fuel cell stack 100, so hydrogen flows from the hydrogen inflow hole 111-1 of the mixing chamber 111 to the hydrogen outflow hole 111-2 thereof.

The hydrogen flowing from the hydrogen inflow hole 111-1 of the mixing chamber 111 to the hydrogen outflow hole 111-2 thereof may act as a driving fluid that absorbs an antioxidant within the antioxidant reservoir 114 (e.g., an antioxidant vaporized by ultrasonic waves generated by the ultrasonic transducer 117) as if the hydrogen absorbs the antioxidant in a vacuum. Accordingly, the vaporized antioxidant within the antioxidant reservoir 114 can be easily supplied to the mixing chamber 111 through the discharge pipe 112.

The discharge pipe 112 may have a nozzle shape inclined from the hydrogen inflow hole 111-1 toward the hydrogen outflow hole 111-2 and having a diameter gradually narrowed toward the mixing chamber 111 so that the antioxidant within the antioxidant reservoir 114 (e.g., an antioxidant vaporized by ultrasonic waves generated by the ultrasonic transducer 117) may be more easily supplied to the mixing chamber 111 through the discharge pipe 112.

To this end, as shown in FIG. 2, an angle θ between the discharge pipe 112 and the partition wall 113 may beset to $0°<\theta<90°$. A lower inner diameter $D_{in}$ of the discharge pipe 112 positioned within the antioxidant reservoir 114 may be set to be greater than an upper inner diameter $D_{out}$ of the discharge pipe 112 positioned within the mixing chamber 111.

The bottom of the discharge pipe 112 may be positioned to match the ultrasonic transducer 117 up and down so that an antioxidant vaporized by ultrasonic waves generated by the ultrasonic transducer 117 directly enters the discharge pipe 112.

Furthermore, a heater 115a who's on and off are controlled by the controller (indicated as 400 in FIG. 1) may be mounted on the antioxidant reservoir 114 in order to heat an antioxidant stored in the antioxidant reservoir 114.

The heater 115a may function to prevent an antioxidant solution within the antioxidant reservoir 114 from being frozen when an external environment is below zero and also to perform heating for the smooth vaporization of an antioxidant.

The heater 115a may be driven by a control signal from the controller 400 before the antioxidant within the antioxidant reservoir 114 is supplied to the mixing chamber 111 so that a temperature of the antioxidant solution may rise to a temperature of about 60 to 80° C. The reason for this is that the antioxidant solution may be rarely vaporized by ultrasonic waves generated by the ultrasonic transducer 117 when a temperature of the antioxidant solution is less than about 60° C. and the antioxidant solution may be excessively vaporized by ultrasonic waves generated by the ultrasonic transducer 117 when a temperature of the antioxidant solution is greater than about 80° C.

Furthermore, a level sensor 116a for detecting a storage level of the antioxidant and transmitting a detection signal to the controller 400 is mounted on the antioxidant reservoir 114.

Accordingly, when the antioxidant stored in the antioxidant reservoir 114 continues to be consumed and is less than a given level, the level sensor 116a may transmit a level detection signal to the controller 400. In response thereto, the controller 400 may induce the filling of the antioxidant by displaying a warning sentence for the filling of the antioxidant on the interior display of a fuel cell vehicle.

A user can recognize filling timing of the antioxidant without missing the filling timing because the user can monitor the remaining amount of the antioxidant through the display in response to the level detection signal of the level sensor 116a.

As illustrated in FIG. 3, the first antioxidant supply device 110 may be positioned in one of the upstream A or downstream B of the ejector 210 on the hydrogen supply line 201 and the upstream C of the ejector 210 on the hydrogen recycle line 202.

A flow of an operation of the first antioxidant supply device 110 is described below.

Figure 4:
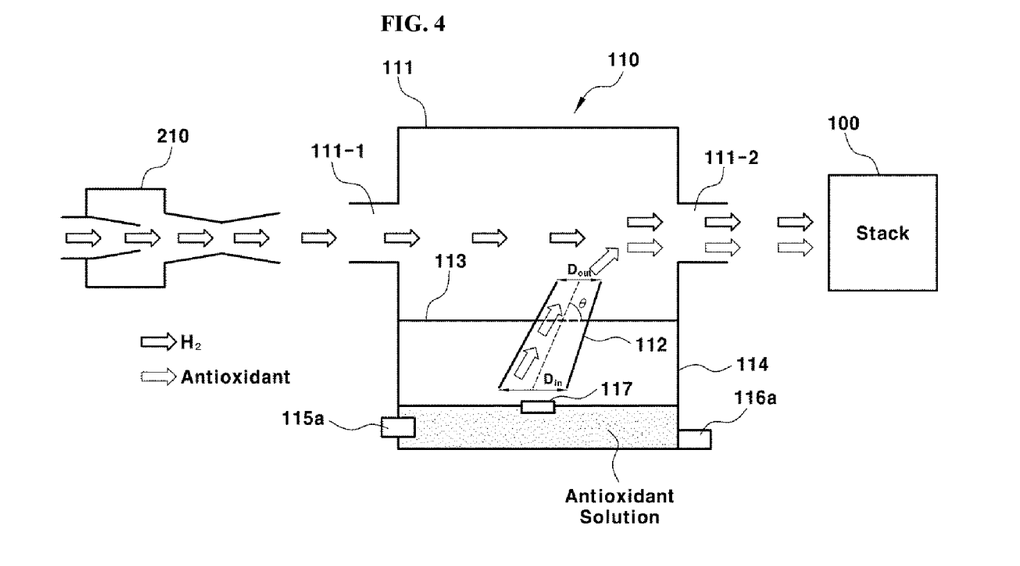
FIG. 4 shows the state in which the first antioxidant supply device illustrated in FIG. 2 is positioned at a location B indicated in FIG. 3.

FIG. 4 shows a schematic sectional view illustrating the state in which the first antioxidant supply device 110 illustrated in FIG. 2 is positioned in the location B (between the ejector 210 and the fuel cell stack 100) indicated in FIG. 3.

As shown in FIG. 4, when the ejector 210 supplies new hydrogen and/or recycle hydrogen from the hydrogen tank to the mixing chamber 111, the hydrogen may enter the mixing chamber 111 through the hydrogen inflow hole 111-1 and may be supplied to the fuel cell stack 100 through the hydrogen outflow hole 111-2.

In this case, at required timing at which an antioxidant needs to be supplemented and supplied to the fuel cell stack 100, the antioxidant may be supplied from the first antioxidant supply device 110 to the fuel cell stack 100 in response to a command signal from the controller 400.

The required timing at which the antioxidant needs to be supplemented and supplied to the fuel cell stack 100 may be different depending on an operation mode of the fuel cell stack 100. The required timing may be set as timing at which the fuel cell stack has operated for a given time (e.g., timing after an operation for tens of thousands of hours) after the fuel cell system was first fabricated or timing at which mileage of a vehicle on which the fuel cell stack is mounted reaches given mileage (e.g., mileage of tens of thousands of km).

Accordingly, when the controller 400 determines the required timing at which the antioxidant needs to be supplemented and supplied to the fuel cell stack 100 based on a cumulative operation time of the fuel cell stack or a cumulative mileage of the vehicle, the controller 400 applies a current signal for driving to the heater 115a and ultrasonic transducer 117 of the first antioxidant supply device 110.

Next, a temperature of an antioxidant solution within the antioxidant reservoir 114 may rise to a temperature of about 60 to 80° C. at which the antioxidant solution can be properly vaporized by the driving of the heater 115a. The antioxidant solution may be easily vaporized by ultrasonic waves generated by the ultrasonic transducer 117.

Accordingly, after the antioxidant vaporized within the antioxidant reservoir 114 enters the mixing chamber 111 through the discharge pipe 112, the antioxidant may be mixed with hydrogen and supplied to the fuel cell stack 100.

It is better to supply the antioxidant in a section in which a current of the fuel cell stack 100 is greater than 0 A. The reason for this is that the antioxidant can be easily supplied to each of the unit cells of the fuel cell stack with a sufficient flow of a fluid, such as hydrogen from the FPS operating in order to generate the current for the fuel cell stack and oxygen from the APS.

Accordingly, state information, indicating that a current of the fuel cell stack 100 is greater than 0 A, may be additionally used as an element necessary for the controller 400 to determine the required timing at which the antioxidant needs to be supplemented and supplied to the fuel cell stack 100.

Alternatively, temperature information, indicating that a temperature of a stack coolant is about 60° C. or greater, may be additionally used as an element necessary for the controller 400 to determine the required timing at which the antioxidant needs to be supplemented and supplied to the fuel cell stack 100, for the smooth supply of the antioxidant and an easy migration within a membrane electrode assembly.

Accordingly, after the fuel cell system starts, when a temperature of the stack coolant becomes 60° C. or greater, the antioxidant may be supplied to the fuel cell stack in response to a command from the controller 400. In this case, the reason why the temperature of the stack coolant is limited to 60° C. or greater is that when the temperature of the stack coolant is similar to a temperature of the antioxidant (e.g., a temperature raised to 60 to 80° C. by the heater as described above) supplied to the fuel cell stack, the antioxidant can be easily supplied to the electrode and the electrolyte membrane as much as possible without a condensation state.

As described above, since the antioxidant is supplemented and supplied to the fuel cell stack 100 using the first antioxidant supply device 110 according to an embodiment of the present invention, the amount of an antioxidant lost within the ionomer of the electrolyte membrane or the electrode layer that constitutes the fuel cell stack can be compensated for. Accordingly, the chemical durability of a membrane electrode assembly can be improved.

The first antioxidant supply device 110 may be positioned at a given location of the FPS 200.

Figure 6:
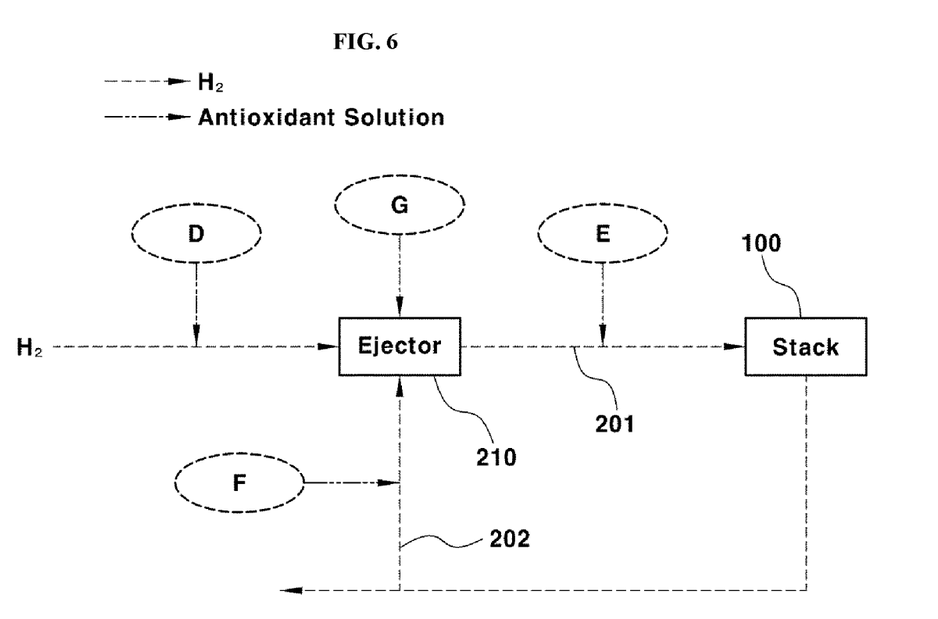
FIG. 6 shows locations where the first antioxidant supply device illustrated in FIG. 5 may be positioned in the FPS.

For example, as illustrated in FIG. 6, the first antioxidant supply device 110 may be positioned in one of the upstream D or downstream E of the ejector 210 on the hydrogen supply line 201, the upstream F of the ejector 210 on the hydrogen recycle line 202, and a location directly coupled to the ejector 210.

Figure 5:
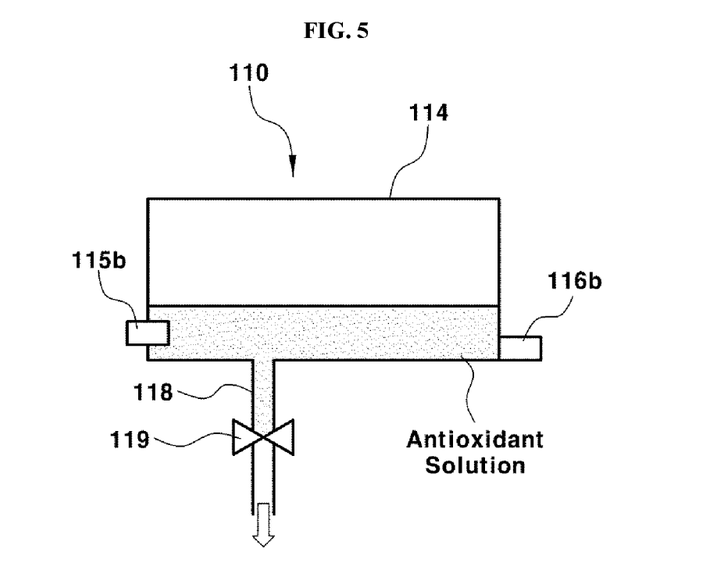
FIG. 5 shows the first antioxidant supply device according to an exemplary embodiment of the present invention, among the elements of the fuel cell system.

As shown in FIG. 5, the first antioxidant supply device 110 may be configured to include the antioxidant reservoir 114 in which an antioxidant is stored, a discharge pipe 118 coupled to the bottom of the antioxidant reservoir 114, and a valve 119 mounted on the discharge pipe 118 and opened and shut by a control signal from the controller.

Furthermore, a heater 115b who's on and off are controlled by the controller may be mounted on the antioxidant reservoir 114.

The heater 115b may function to prevent an antioxidant solution within the antioxidant reservoir 114 from being frozen and to prevent additional condensation or an excessive energy loss by heating an antioxidant to a temperature similar to an operating temperature of the fuel cell system.

To this end, the heater 115b may be driven in response to a control signal from the controller 400 before the antioxidant within the antioxidant reservoir 114 may be supplied to the fuel cell stack so that a temperature of the antioxidant solution rises to about 60 to 80° C.

Furthermore, a level sensor 116b for detecting a storage level of the antioxidant and transmitting a detection signal to the controller 400 may be mounted on the antioxidant reservoir 114.

Accordingly, when the antioxidant stored in the antioxidant reservoir 114 continues to be consumed and is less than a given level, the level sensor 116b transmits a level detection signal to the controller 400. In response thereto, the controller 400 may induce the filling of the antioxidant by displaying a warning sentence for the filling of the antioxidant on the interior display of a fuel cell vehicle.

As illustrated in FIG. 6, the first antioxidant supply device 110 may be positioned in one of the upstream D or downstream E of the ejector 210 on the hydrogen supply line 201 and the upstream F of the ejector 210 on the hydrogen recycle line 202.

A flow of an operation of the first antioxidant supply device 110 is described below.

Figure 7:
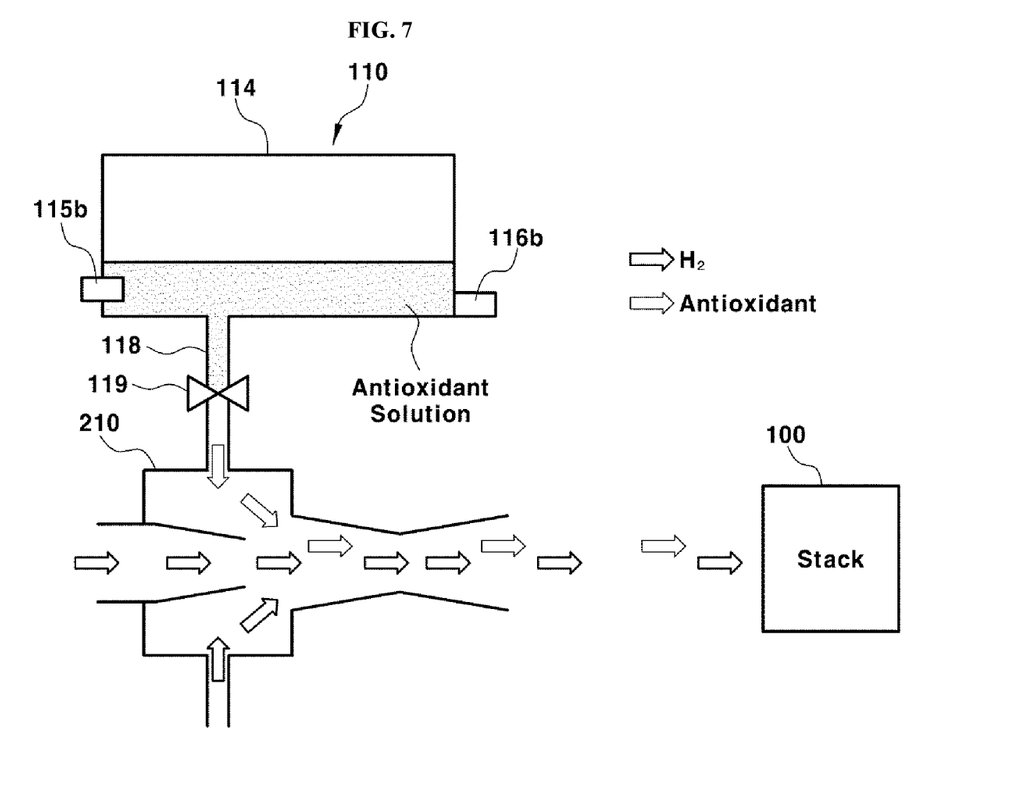
FIG. 7 shows the state in which the first antioxidant supply device illustrated in FIG. 5 is positioned at a location G indicated in FIG. 6.

FIG. 7 shows the state in which the first antioxidant supply device 110 illustrated in FIG. 5 is positioned in the location G (i.e., the location directly coupled to the ejector 210) illustrated in FIG. 6.

As shown in FIG. 7, the discharge pipe 118 coupled to the bottom of the antioxidant reservoir 114, among the elements of the first antioxidant supply device 110, may be coupled to the ejector 210 in a way to communicate with the ejector 210.

The ejector 210 may supply new hydrogen and/or recycle hydrogen from the hydrogen tank to the fuel cell stack 100.

In this case, at required timing at which an antioxidant needs to be supplemented and supplied to the fuel cell stack 100, the antioxidant may be supplied from the first antioxidant supply device 110 to the fuel cell stack 100 in response to a command signal from the controller 400.

As described above, the required timing at which the antioxidant needs to be supplemented and supplied to the fuel cell stack 100 may be different depending on an operation mode of the fuel cell stack 100. The required timing may be set as timing at which the fuel cell stack has operated for a given time (e.g., timing after an operation for tens of thousands of hours) after the fuel cell system was first fabricated or timing at which mileage of a vehicle on which the fuel cell stack is mounted reaches given mileage (e.g., mileage of tens of thousands of km).

Accordingly, when the controller 400 determines the required timing at which the antioxidant needs to be supplemented and supplied to the fuel cell stack 100 based on a cumulative operation time of the fuel cell stack or a cumulative mileage of the vehicle, the controller 400 may apply a current signal for the driving of the heater 115*b* included in the first antioxidant supply device 110 according to the another embodiment and also may apply a control signal for opening to the valve 119.

Next, after a temperature of the antioxidant solution within the antioxidant reservoir 114 rises to about 60 to 80° C. by the driving of the heater 115*b*, the antioxidant enters the ejector 210 by the opening operation of the valve 119.

Accordingly, after the antioxidant within the antioxidant reservoir 114 enters the ejector 210 through the valve 119, the antioxidant may be mixed with hydrogen and supplied to the fuel cell stack 100.

It is better to supply the antioxidant in a section in which a current of the fuel cell stack 100 is greater than 0 A. The reason for this is that the antioxidant can be easily supplied to each of the unit cells of the fuel cell stack with a sufficient flow of a fluid, such as hydrogen from the FPS operating in order to generate the current for the fuel cell stack and oxygen from the air processing system.

Accordingly, state information indicating that a current of the fuel cell stack 100 is greater than 0 A may be additionally used as an element necessary for the controller 400 to determine the required timing at which the antioxidant needs to be supplemented and supplied to the fuel cell stack 100.

Alternatively, temperature information indicating that a temperature of a stack coolant is about 60° C. or greater for the smooth supply of the antioxidant and an easy migration within a membrane electrode assembly may be additionally used as an element necessary for the controller 400 to determine the required timing at which the antioxidant needs to be supplemented and supplied to the fuel cell stack 100.

Accordingly, after the fuel cell system starts, when a temperature of the stack coolant becomes about 60° C. or greater, the antioxidant may be supplied to the fuel cell stack in response to a command from the controller 400. As described above, the reason why the temperature of the stack coolant may be limited to about 60° C. or greater is that when the temperature of the stack coolant is similar to a temperature of the antioxidant (e.g., a temperature raised to 60 to 80° C. by the heater as described above) supplied to the fuel cell stack, the antioxidant maybe easily supplied to the electrode and the electrolyte membrane as much as possible without a condensation state.

As described above, since the antioxidant is supplemented and supplied to the fuel cell stack 100 using the first antioxidant supply device 110, the amount of an antioxidant lost within the ionomer of the electrolyte membrane or the electrode layer that constitutes the fuel cell stack can be compensated for. Accordingly, the chemical durability of a membrane electrode assembly can be improved.

A second antioxidant supply device 120 positioned in the air processing system (APS) 300 of the fuel cell system a is described below.

As shown in FIG. 1, the APS 300 may be configured to include a filter 301 for filtering external air, a compressor 302 for compressing and supplying the external air, a humidifier 320 for humidifying the compressed dry air and supplying the humidified air to the fuel cell stack 100, etc.

In particular, the second antioxidant supply device 120 may be separately mounted on the humidifier 320 among the elements of the APS 300 or integrated with the humidifier 320.

Figure 8:
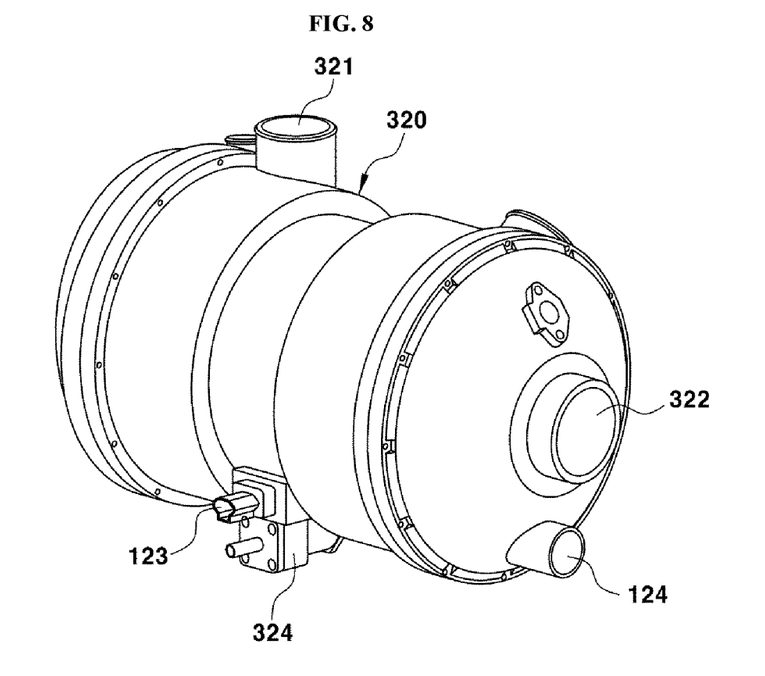
FIG. 8 shows an external perspective view illustrating the state in which a second antioxidant supply device of the elements of the fuel cell system according to an exemplary embodiment of the present invention is provided in a humidifier.
Figure 9:
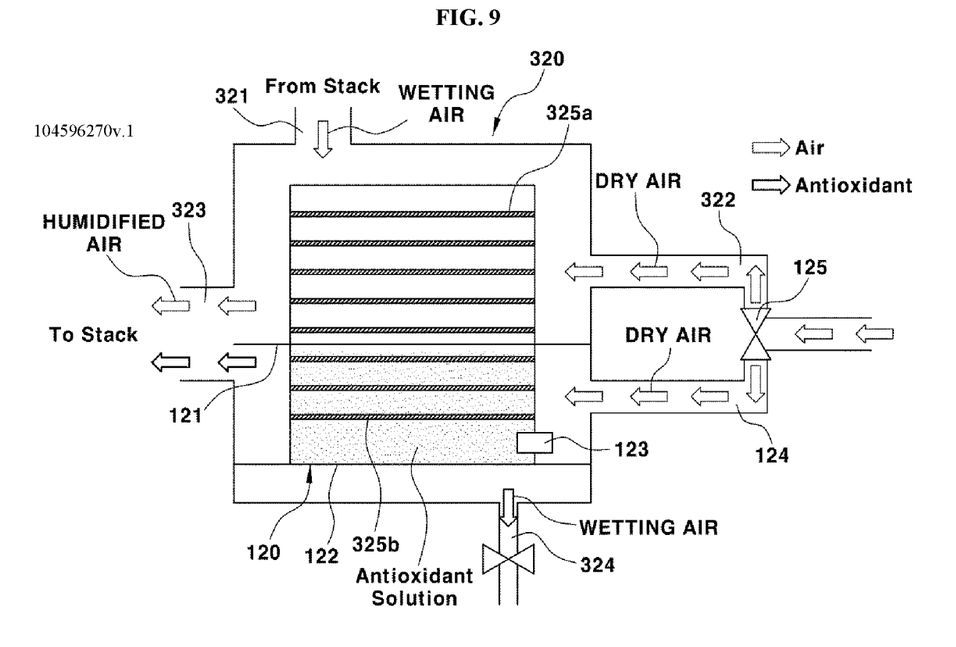
FIG. 9 shows the state in which the second antioxidant supply device of the elements of the fuel cell system according to an exemplary embodiment of the present invention is provided in a humidifier.

FIGS. 8 and 9 are diagrams illustrating the state in which the second antioxidant supply device 120 of the elements of the fuel cell system may be provided in the humidifier 320. A reference numeral 320 denotes the humidifier.

A wetting air inlet 321 extended from the fuel cell stack is formed on the upper side of the humidifier 320. A first dry air inlet 322 into which dry air is introduced may be formed on one side of the humidifier 320. A humidified air supply hole 323 through which humidified air may be directed toward the fuel cell stack is formed on the other side of the humidifier 320. A wetting air outlet 324 through which the remaining wetting air after the dry air is humidified may be discharged to the outside is formed at the bottom of the humidifier 320.

In this case, a hollow fiber membrane 325*a* having a bundle form may be positioned within the humidifier 320 so that dry air from the compressor may be humidified through the hollow fiber membrane 325*a*.

In particular, the second antioxidant supply device 120 may be mounted on the bottom of the humidifier 320.

As shown in FIGS. 8 and 9, the second antioxidant supply device 120 may be configured to include an antioxidant reservoir 122 positioned at the bottom of the humidifier 320 therein with a partition wall 121 interposed between the antioxidant reservoir 122 and the mixing chamber, and a level sensor 123 for detecting an antioxidant level within the antioxidant reservoir 122.

In this case, a hollow fiber membrane 325*b* having a bundle form may be positioned within the antioxidant reservoir 122 so that dry air from the compressor holds an antioxidant while passing through the hollow fiber membrane 325*b*.

An element made of polyether sulfone (PES) or polyetherimide (PEI) may be adopted as the hollow fiber membrane 325*a*, 325*b*.

In addition to the first dry air inlet 322 into which dry air is introduced, a second dry air inlet 124 through which dry air is guided to the antioxidant reservoir 122 may be formed on one side of the humidifier 320.

A valve 125 for an air distribution, which is opened and shut to supply dry air from the compressor 302 to the humidifier 320 through the first dry air inlet 322 or simultaneously supply dry air from the compressor 302 to the humidifier 320 and the second antioxidant supply device 120, may be positioned at the rear end of the first dry air inlet 322 and the second dry air inlet 124.

A flow of an operation of the second antioxidant supply device positioned in the APS of the fuel cell system is described below.

In a normal operating condition of the fuel cell system, after external air compressed by the compressor 302, such as dry air, may be supplied to the humidifier 320 through the first dry air inlet 322, the dry air may flow along the inside of the hollow fiber membrane 325*a*.

At the same time, wetting air discharged from the fuel cell stack may permeate into the inside of the hollow fiber membrane 325*a*, and thus the dry air flowing along the inside of the hollow fiber membrane 325*a* may be humidified. The humidified air may exit from the hollow fiber membrane 325*a* and may be supplied to the cathode electrode of the fuel cell stack.

In this case, at required timing at which an antioxidant needs to be supplemented and supplied to the fuel cell stack 100, the antioxidant may be supplied from the second antioxidant supply device 120 to the fuel cell stack 100 in response to a command signal from the controller 400.

As described above, the required timing at which the antioxidant needs to be supplemented and supplied to the fuel cell stack 100 may be different depending on an operation mode of the fuel cell stack, but may be set as timing at which the fuel cell stack has operated for tens of thousands of hours after the fuel cell system was first fabricated or timing at which mileage of a vehicle on which the fuel cell stack is mounted reaches mileage of tens of thousands of km.

Accordingly, when the controller 400 determines the required timing at which the antioxidant needs to be supplemented and supplied to the fuel cell stack 100 based on a cumulative operation time of the fuel cell stack or cumulative mileage of the vehicle, the controller 400 may apply a control signal for opening to the valve 125 for an air distribution.

Accordingly, the dry air from the compressor 302 may be supplied to the humidifier 320 through the first dry air inlet 322 and may be simultaneously supplied to the antioxidant reservoir 122 of the second antioxidant supply device 120 through the second dry air inlet 124.

When the dry air supplied to the antioxidant reservoir 122 flows along the inside of the hollow fiber membrane 325b, the antioxidant stored in the antioxidant reservoir 122 may permeate into the hollow fiber membrane 325b, and thus humidification by which the dry air holds the antioxidant may be performed.

Accordingly, air containing the antioxidant having a state in which the dry air has been humidified as the antioxidant within the hollow fiber membrane 325b may exit from the hollow fiber membrane 325a and may be supplied to the fuel cell stack.

As described above, since the antioxidant is supplemented and supplied to the fuel cell stack 100 using the second antioxidant supply device 120, the amount of an antioxidant lost within the ionomer of the electrolyte membrane or the electrode layer constituting the fuel cell stack can be compensated for. Accordingly, the chemical durability of a membrane electrode assembly can be improved.

Further, an antioxidant may be supplied to the fuel cell stack using only the first antioxidant supply device 110 positioned in the FPS 200, an antioxidant may be supplied to the fuel cell stack using only the second antioxidant supply device 120 positioned in the APS 300, or an antioxidant may be supplied to the fuel cell stack using both the first antioxidant supply device 110 and the second antioxidant supply device 120.

An antioxidant which may be applied to embodiments of the present invention may include antioxidants having metal oxide (e.g., cerium oxide or manganese oxide), cerium (III) nitrate hexahydratem cerium sulphate, terephthalic acid-based antioxidant, or perovskite structures. One or two or more types of the antioxidants may be used.

Furthermore, a primary antioxidant, such as a cerium-based antioxidant, such as cerium oxide or ceria or cerium (III) nitrate hexahydrate, or a terephthalic-based acid antioxidant, and a secondary antioxidant, such as manganese oxide, may be separately used as an antioxidant which may be applied to various exemplary embodiments of the present invention. Alternatively, the primary antioxidant and the secondary antioxidant may be used together. Cerium (III) nitrate hexahydrate may be preferably used when mobility within the electrolyte membrane of the antioxidant is taken into consideration.

The present invention provides the following effects through the solving means. In preparation for a case where an antioxidant within the electrolyte membrane or electrode of the fuel cell stack is lost due to the dissolution or migration characteristic of the antioxidant when the fuel cell stack is fabricated, the antioxidant may be supplied to the fuel cell stack at timing at which the antioxidant is supplied using a separate antioxidant supply device provided in the FPS and/or the APS. Accordingly, the chemical durability of a membrane electrode assembly can be improved by compensating for the amount of an antioxidant lost within the electrolyte membrane or the electrode.

Although exemplary embodiments of the invention have been disclosed for illustrative purposes, those skilled in the art will appreciate that various modifications, additions and substitutions are possible, without departing from the scope and spirit of the invention as defined in the accompanying claims. Thus, the true technical scope of the invention should be defined by the following claims.

While the exemplary embodiments of the present invention have been described above in detail, the terms and words used in the present specification and claims should not be construed as being limited to the ordinary or dictionary meanings, and in addition, the configurations illustrated in the exemplary embodiments and drawings described in the present specification are only one preferred exemplary embodiments of the present invention, so that the scope of the present invention is not limited to the aforementioned exemplary embodiments, and various modifications and improvements by those skilled in the art using the basic concept of the present invention defined in the appended claims are also included in the scope of the present invention.

What is claimed is:

1. A fuel cell system comprising:
    an antioxidant supply device positioned at a predetermined location of a fuel processing system (FPS) for supplying hydrogen to a fuel cell stack, a predetermined location of an air processing system (APS) for supplying air to the fuel cell stack, or a predetermined location of the FPS and the APS; and
    a controller configured to control an antioxidant to be supplied from the antioxidant supply device positioned at the predetermined location of the FPS or the APS to the fuel cell stack, or to control the antioxidant to be supplied from the antioxidant supply device positioned at the predetermined location of the FPS and the APS to the fuel cell stack, at predetermined discrete required timing when the antioxidant needs to be further supplied to the fuel cell stack.

2. The fuel cell system of claim 1, wherein a first antioxidant supply device positioned at the predetermined location of the FPS in the antioxidant supply device is positioned upstream or downstream of an ejector on a hydrogen supply line of the FPS, or upstream of the ejector on a hydrogen recycle line, or a location directly coupled to the ejector.

3. The fuel cell system of claim 1, wherein the controller is configured to determine that the antioxidant needs to be further supplied to the fuel cell stack either when a predetermined time of operation of the fuel stack has expired or when a vehicle on which the fuel cell stack is mounted has reached a predetermined mileage.

4. The fuel cell system of claim 2, wherein the first antioxidant supply device comprises:
    a mixing chamber having a hydrogen inflow hole formed on one side thereof and a hydrogen outflow hole formed on the other side thereof;
    an antioxidant reservoir positioned under the mixing chamber;

a partition wall configured to divide the mixing chamber and the antioxidant reservoir as separate spaces; and an antioxidant discharge pipe mounted on the partition wall while making the mixing chamber and the antioxidant reservoir communicate with each other and configured to discharge the antioxidant within the antioxidant reservoir to the mixing chamber.

5. The fuel cell system of claim 4, wherein an ultrasonic transducer operating to generate ultrasonic waves in response to a control signal from the controller in order to vaporize the antioxidant is mounted on the antioxidant reservoir.

6. The fuel cell system of claim 4, wherein the antioxidant discharge pipe has a nozzle shape inclined from the hydrogen inflow hole towards the hydrogen outflow hole and having a diameter narrowed towards the mixing chamber.

7. The fuel cell system of claim 4, wherein:
an angle θ between the antioxidant discharge pipe and the partition wall is set to 0°<θ<90°, and
a lower inner diameter of the discharge pipe positioned within the antioxidant reservoir is set to be greater than an upper inner diameter of the discharge pipe positioned within the mixing chamber.

8. The fuel cell system of claim 4, wherein a heater who's on and off are controlled by the controller in order to heat the antioxidant is mounted on the antioxidant reservoir.

9. The fuel cell system of claim 8, wherein the heater is adopted to operate to raise a temperature of an antioxidant solution to about 60 to 80° C. in response to a control signal from the controller before the antioxidant is supplied to the mixing chamber.

10. The fuel cell system of claim 4, wherein a level sensor for detecting a storage level of the antioxidant and transmitting a detection signal to the controller is mounted on the antioxidant reservoir.

11. The fuel cell system of claim 10, wherein the controller is configured to determine filling timing of the antioxidant based on the detection signal of the level sensor and to display a warning for the filling of the antioxidant on an interior display of a fuel cell vehicle.

12. The fuel cell system of claim 2, wherein the first antioxidant supply device comprises:
an antioxidant reservoir in which the antioxidant is stored;
a discharge pipe coupled to a bottom of the antioxidant reservoir; and
a valve mounted on the discharge pipe and configured to be opened and shut in response to a control signal from the controller.

13. The fuel cell system of claim 12, wherein a heater who's on and off are controlled by the controller in order to heat the stored antioxidant is mounted on the antioxidant reservoir.

14. The fuel cell system of claim 13, wherein the heater operates to raise a temperature of an antioxidant solution to about 60 to 80° C. in response to a control signal from the controller before the antioxidant is supplied to the fuel cell stack.

15. The fuel cell system of claim 13, wherein a level sensor for detecting a storage level of the antioxidant and transmitting a detection signal to the controller is mounted on the antioxidant reservoir.

16. The fuel cell system of claim 15, wherein the controller is configured to determine filling timing of the antioxidant based on the detection signal of the level sensor and to display a warning for the filling of the antioxidant on an interior display of a fuel cell vehicle.

17. The fuel cell system of claim 1, wherein a second antioxidant supply device positioned at the predetermined location of the APS in the antioxidant supply device is positioned within a humidifier,
wherein the second antioxidant supply device comprises:
an antioxidant reservoir positioned at a bottom of the humidifier within the humidifier with a partition wall interposed between the antioxidant reservoir and the mixing chamber; and
a hollow fiber membrane positioned within the antioxidant reservoir and positioned so that the antioxidant permeates into the hollow fiber membrane through which dry air passes,
wherein a second dry air inlet for leading the dry air into the antioxidant reservoir is formed on one side of the humidifier in addition to a first dry air inlet for leading the dry air into the humidifier.

18. The fuel cell system of claim 17,
wherein a valve for an air distribution, which is opened and shut to supply the dry air to the humidifier through the first dry air inlet or simultaneously supply the dry air to the humidifier and the second antioxidant supply device, is positioned at a rear end of the first dry air inlet and the second dry air inlet; and/or
wherein a level sensor for detecting a storage level of the antioxidant and transmitting a detection signal to the controller is mounted on the antioxidant reservoir.

19. The fuel cell system of claim 18, wherein the controller is configured to determine filling timing of the antioxidant based on the detection signal of the level sensor and to display a warning for the filling of the antioxidant on an interior display of the fuel cell vehicle.

20. The fuel cell system of claim 1, wherein the controller is configured to additionally use state information that indicates i) a current of the fuel cell stack exceeds 0 A, as an element to determine when the antioxidant needs to be further supplied to the fuel cell stack, and/or ii) a temperature of a stack coolant is 60° C. or greater, as an element to determine when the antioxidant needs to be further supplied to the fuel cell stack for a supply of the antioxidant and a migration of the antioxidant within a membrane electrode assembly.

21. A fuel cell system comprising:
an antioxidant supply device positioned at a predetermined location of a fuel processing system (FPS) for supplying hydrogen to a fuel cell stack, a predetermined location of an air processing system (APS) for supplying air to the fuel cell stack, or a predetermined location of the FPS and the APS; and
a controller configured to control an antioxidant to be supplied from the antioxidant supply device positioned at the predetermined location of the FPS or the APS to the fuel cell stack, or to control the antioxidant to be supplied from the antioxidant supply device positioned at the predetermined location of the FPS and the APS to the fuel cell stack,
wherein the controller is also configured to determine that the antioxidant needs to be further supplied to the fuel cell stack in order to compensate for the amount of the antioxidant lost when the antioxidant is lost in an electrolyte membrane of the fuel cell stack and ionomer of anode and cathode electrodes.

* * * * *